United States Patent
Yokoyama et al.

(10) Patent No.: US 6,385,523 B1
(45) Date of Patent: May 7, 2002

(54) APPARATUS FOR DETERMINING A STATE OF BRAKING OPERATION

(75) Inventors: Satoshi Yokoyama, Nishio; Shinsuke Sakane, Handa; Masanobu Fukami; Yoshiaki Tsuchiya, both of Aichi, all of (JP)

(73) Assignees: Aisin Seiki Kabushiki Kaisha, Kariya; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/598,708

(22) Filed: Jun. 21, 2000

(30) Foreign Application Priority Data

Jun. 21, 1999 (JP) ............................................ 11-174198

(51) Int. Cl.$^7$ ............................. B60T 8/32; B60T 8/58; B60K 31/00
(52) U.S. Cl. ............................. 701/70; 701/74; 701/90; 303/154
(58) Field of Search ............................. 701/70, 71, 74, 701/85, 72, 90, 91; 303/158, 174, 173, 167, 187, 116.1, 10, 113.4, 113.5, 115.4, 166, 154, 122.01, 113.1, 156, 140, 146, 147, 148, 113.2, 119.1, 155; 180/197

(56) References Cited

U.S. PATENT DOCUMENTS

| | | | | |
|---|---|---|---|---|
| 4,984,164 A | * | 1/1991 | Maehara et al. | ........ 364/426.02 |
| 5,014,202 A | * | 5/1991 | Thatcher | ................. 364/426.03 |
| 5,458,405 A | * | 10/1995 | Watanabe | .................... 303/173 |
| 5,624,164 A | | 4/1997 | Tozu et al. | ................... 303/962 |
| 5,651,592 A | * | 7/1997 | Yasuno et al. | ............... 303/158 |
| 5,890,776 A | * | 4/1999 | Sawada | .................... 303/116.1 |
| 6,106,080 A | * | 8/2000 | Tozu et al. | ............... 303/116.1 |
| 6,185,497 B1 | * | 2/2001 | Taniguchi et al. | ............. 701/70 |

FOREIGN PATENT DOCUMENTS

| | | |
|---|---|---|
| JP | 58-199259 | 11/1983 |
| JP | 59-206247 | 11/1984 |
| JP | 8-108841 | 4/1996 |
| JP | 2591389 | 12/1996 |
| JP | 10-138895 | 5/1998 |

* cited by examiner

Primary Examiner—Tan Nguyen
Assistant Examiner—Dalena Tran
(74) Attorney, Agent, or Firm—Burns, Doane, Swecker & Mathis, LLP

(57) ABSTRACT

The present invention is directed to an apparatus for determining a state of braking operation of a vehicle. Wheel speed sensors are provided for detecting wheel speeds of a front wheel and a rear wheel. A wheel speed difference is calculated between the wheel speed of the front wheel and the wheel speed of the rear wheel detected by the wheel speed sensors. A braking operation detection device is provided for detecting an operation of a brake pedal. Based upon the calculated wheel speed difference and the operation of the brake pedal detected by the braking operation detection device, it is determined whether the brake pedal was rapidly depressed. In accordance with this result, and in response to the wheel speeds detected by the wheel speed sensors, the braking force applied to the front wheel can be adjusted in a predetermined relationship with the braking force applied to the rear wheel.

8 Claims, 6 Drawing Sheets

APPARATUS FOR DETERMINING A STATE OF BRAKING OPERATION

This application claims priority under 35 U.S.C. Sec. 119 to No. 11-174198 filed in Japan on Jun. 21, 1999, the entire content of which is herein incorporated by reference.

BACKGROUND OF THE INVENTION

1. Field of the Invention

The present invention relates to an apparatus for determining a state of braking operation of a vehicle, and more particularly to the apparatus for determining whether a rapid operation of a brake pedal was performed or not, which is applicable to a front-rear braking force distribution control system for controlling the braking force applied to a rear wheel to be in a certain relationship with the braking force applied to a front wheel in accordance with a result determined by the apparatus for determining the state of braking operation.

2. Description of the Related Arts

In general, when a moving vehicle is braked, axle loads applied to the front and rear portions of the vehicle respectively will be different from each other due to the moving load caused by the braking operation. Therefore, the braking force applied to front wheels and the braking force applied to rear wheels for locking all of the wheels simultaneously are not in direct proportion to each other, but in such a relationship as called an ideal braking force distribution, which may be varied depending upon the presence or absence of the load on the vehicle. If the braking force applied to the rear wheels exceeds the braking force applied to the front wheels, the directional stability of the vehicle will be deteriorated. In order to keep the braking force applied to the rear wheel lower than that applied to the front wheel and provide a distribution in close proximity to the ideal braking force distribution, a proportioning valve is provided between the rear wheel brake cylinders and a master cylinder. According to this arrangement, the distribution characteristic has a pair of lines having different gradients from each other. When the difference of the loads applied to the inner and outer wheels of a turning vehicle is taken into consideration for example, it is necessary to reduce the braking force applied to the rear wheels much lower than the braking force applied to the front wheels. Therefore, in the case where it is so arranged that the hydraulic braking pressure is always restricted by the proportioning valve, the braking force distributed to the rear wheels will be reduced, so that a large depressing force to a brake pedal will be needed to ensure a desired deceleration, and an excessive load will be applied to the front wheels.

In order to solve the problem as described above, the U.S. Pat. No. 5,624,164 discloses a braking force distribution control system, which is adapted to control the braking force applied to the rear wheel in a predetermined relationship with the braking force applied to the front wheel, by controlling pressure control valves disposed between the wheel brake cylinder and a hydraulic booster or the master cylinder, and controlling a changeover valve disposed upstream of the control valves. Furthermore, in Japanese patent Laid-open Publication No.8-108841, there is proposed a braking force distribution control system which is capable of performing the braking force distribution properly in accordance with a turning state of a vehicle.

With respect to the braking force distribution control system such as those described above, a rear wheel braking force control apparatus is proposed in Japanese Patent No.2591389, in order to improve braking stability by making a braking force distributed to a rear wheel when the braking force applied to the rear wheel is sufficient, larger than that when the braking force applied to the rear wheel is not sufficient, in response to barking conditions such as a road condition or vehicle running condition. The apparatus is provided with a proportioning valve which is disposed in a passage for transmitting a master cylinder pressure to a rear wheel brake cylinder, to control the wheel cylinder pressure in such a manner that variation of the wheel cylinder pressure in response to the variation of the master cylinder pressure will be made small in a region where the master cylinder pressure is more than a first predetermined pressure, and provided with a switching valve which is disposed in a passage for bypassing the proportioning valve and transmitting the master cylinder pressure to the rear wheel brake cylinder. The switching valve is closed when the master cylinder pressure detected by a master cylinder pressure sensor is larger than a second predetermined pressure which is larger than the first predetermined pressure, while the switching valve is opened when the master cylinder pressure is smaller than the second predetermined pressure. And, when the locking limit for the rear wheel is low, the switching valve is closed irrespective of the master cylinder pressure detected by the master cylinder pressure sensor.

Japanese patent Laid-open Publication No.10-138895 discloses a vehicle brake apparatus, wherein a wheel speed difference between a larger one of front wheel speeds and each rear wheel speed is detected, when a vehicle deceleration and a vehicle speed exceed each reference value respectively. When the difference is greater than a first predetermined value, a solenoid valve device is switched to hold a hydraulic brake pressure, and when the difference is smaller than a second predetermined value, the solenoid valve device is switched to increase the hydraulic brake pressure again, thereby to control the braking force distribution of the front wheel and that of the rear wheel independently to approximate to an ideal curve.

According to the front-rear braking force distribution control apparatuses as described above, when the brake pedal is depressed gradually, the braking force applied to the front and rear wheels is distributed properly in accordance with a desired ratio. However, when the brake pedal is depressed more rapidly than a load is shifted in a normal braking operation, so that the rapid operation of the brake pedal is performed, then a control for distributing the braking force applied to the front and rear wheels will be delayed. This is because when the brake pedal is depressed rapidly, the front wheel cylinder pressure will reach a pressure for enabling the wheel to be locked before a desired load shift will occur, to result in a large drop of the front wheel speed, so that the condition for beginning the braking force distribution control will not be fulfilled, although it is generally constituted in such a manner that the braking force distribution control will begin when the rear wheel speed becomes to be smaller than the front wheel speed by more than a predetermined value. Thereafter, the load will be shifted to the front wheel to reduce the rear wheel speed, and when the rear wheel speed will be smaller than the front wheel speed by more than the predetermined value, the braking force distribution control will finally begin.

FIG. 5 shows variations of front and rear wheel speeds, and the difference between the wheel speeds obtained when the brake pedal is rapidly depressed. When the brake pedal is rapidly depressed at the time "t0", a reduction of the front wheel speed Vwfs becomes to be greater than the reduction of the rear wheel speed Vwr*, so that the braking force distribution control will begin at the time "t2" when the rear wheel speed Vwr* will become to be smaller than the front wheel speed Vwfs by more than a predetermined value K2 (positive value), thereby to prolong the period after the brake pedal is depressed until the braking force distribution control will begin. Referring to FIG. 6, when the brake pedal is rapidly depressed, a front wheel cylinder pressure will vary as shown by a solid line (Pfe) in FIG. 6, whereas the front wheel cylinder pressure will vary as shown by a broken line (Pfs) when the brake pedal is depressed normally. That is, when the brake pedal is depressed normally and the braking force is applied to the front and rear wheels, the front wheel cylinder pressure Pfs will reach a locking pressure Pkb, in such a state that a load has been shifted from the rear wheel to the front wheel sufficiently to cause a load "Lb" be shifted to the front wheel. However, when the brake pedal is depressed rapidly, the front wheel cylinder pressure Pfe will reach a locking pressure Pka, in such a state that the load has not been shifted from the rear wheel to the front wheel sufficiently to cause only a load "La" be shifted to the front wheel. Therefore, the front wheel speed Vwfs will become to be smaller than the rear wheel speed Vwr* as shown in FIG. 5, the condition for beginning the braking force distribution control will not be fulfilled for a relatively long time. In FIG. 6, the locking pressure Pke indicates a value obtained when no load shift occurs.

In the Japanese Patent No.2591389, however, nothing is disclosed about the rapid operation of the brake pedal as described above. And, the apparatus as disclosed in the Japanese Patent No.2591389 is to be provided with a pressure sensor in addition to wheel speed sensors, thereby to cause a cost-up. On the contrary, in the Japanese patent Laid-open Publication No.10-138895, it is disclosed that the vehicle deceleration, the vehicle speed, and the wheel speed difference between the front and rear wheels are employed. In this publication, however, nothing is disclosed about the rapid operation of the brake pedal, so that the aforementioned problem can not be solved.

SUMMARY OF THE INVENTION

Accordingly, it is an object of the present invention to provide an apparatus for determining a state of braking operation of a vehicle, wherein it can be determined whether a rapid operation of a brake pedal was performed or not, without any particular sensors.

It is another object of the present invention to provide a front-rear braking force distribution control system, wherein it can be determined whether the rapid operation of the brake pedal was performed or not, without any particular sensors, and based upon the determined result, a braking force applied to a rear wheel can be adjusted properly to be in a certain relationship with the braking force applied to a front wheel.

In accomplish the above and other objects, an apparatus for determining a state of braking operation of a vehicle includes a wheel speed detection device for detecting each wheel speed of a front wheel and a rear wheel of the vehicle, and includes a wheel speed difference calculation device for calculating a wheel speed difference between the wheel speed of the front wheel and the wheel speed of the rear wheel detected by the wheel speed detection device. The apparatus further includes a braking operation detection device for detecting an operation of a brake pedal of the vehicle, and includes a rapid operation determination device, which determines whether the brake pedal was rapidly depressed on the basis of the difference calculated by the wheel speed difference calculation device and the operation of the brake pedal detected by the braking operation detection device.

In the apparatus, it is preferable that the rapid operation determination device determines that the brake pedal was rapidly depressed, in the case where it was determined that the wheel speed of the front wheel exceeded the wheel speed of the rear wheel after it was determined on the basis of the difference calculated by the wheel speed difference calculation device that the wheel speed of the front wheel was lower than the wheel speed of the rear wheel by more than a predetermined difference, within a predetermined time period after the braking operation detection device detected the operation of the brake pedal.

The apparatus may further comprise a vehicle deceleration calculation device for calculating a vehicle deceleration on the basis of the wheel speeds detected by the wheel speed detection device. In this case, the rapid operation determination device is adapted to determine that the brake pedal was rapidly depressed, in the case where it was determined on the basis of the deceleration calculated by the vehicle deceleration calculation device that the vehicle deceleration was greater than a predetermined deceleration, and it was determined that the wheel speed of the front wheel exceeded the wheel speed of the rear wheel after it was determined on the basis of the difference calculated by the wheel speed difference calculation device that the wheel speed of the front wheel was lower than the wheel speed of the rear wheel by more than a predetermined difference, within a predetermined time period after the braking operation detection device detected the operation of the brake pedal.

The above-described apparatus for determining a state of braking operation of the vehicle may be incorporated into a front-rear braking force distribution control system, which includes wheel brake cylinders operatively mounted on the front and rear wheels for applying the braking force thereto, respectively, a pressure generating device for pressurizing brake fluid in response to operation of the brake pedal to generate a hydraulic braking pressure and supply the hydraulic braking pressure to each of the wheel brake cylinders, and a pressure control device disposed between the pressure generating device and the wheel brake cylinders for controlling the hydraulic braking pressure in each of the wheel brake cylinders. And, a braking force control device is provided for controlling the pressure control device at least on the basis of the result determined by the rapid operation determination device, and in response to the wheel speeds detected by the wheel speed detection device, and controlling the hydraulic braking pressure in each of the wheel brake cylinders to adjust the braking force applied to the rear wheel in accordance with a predetermined relationship with the braking force applied to the front wheel.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
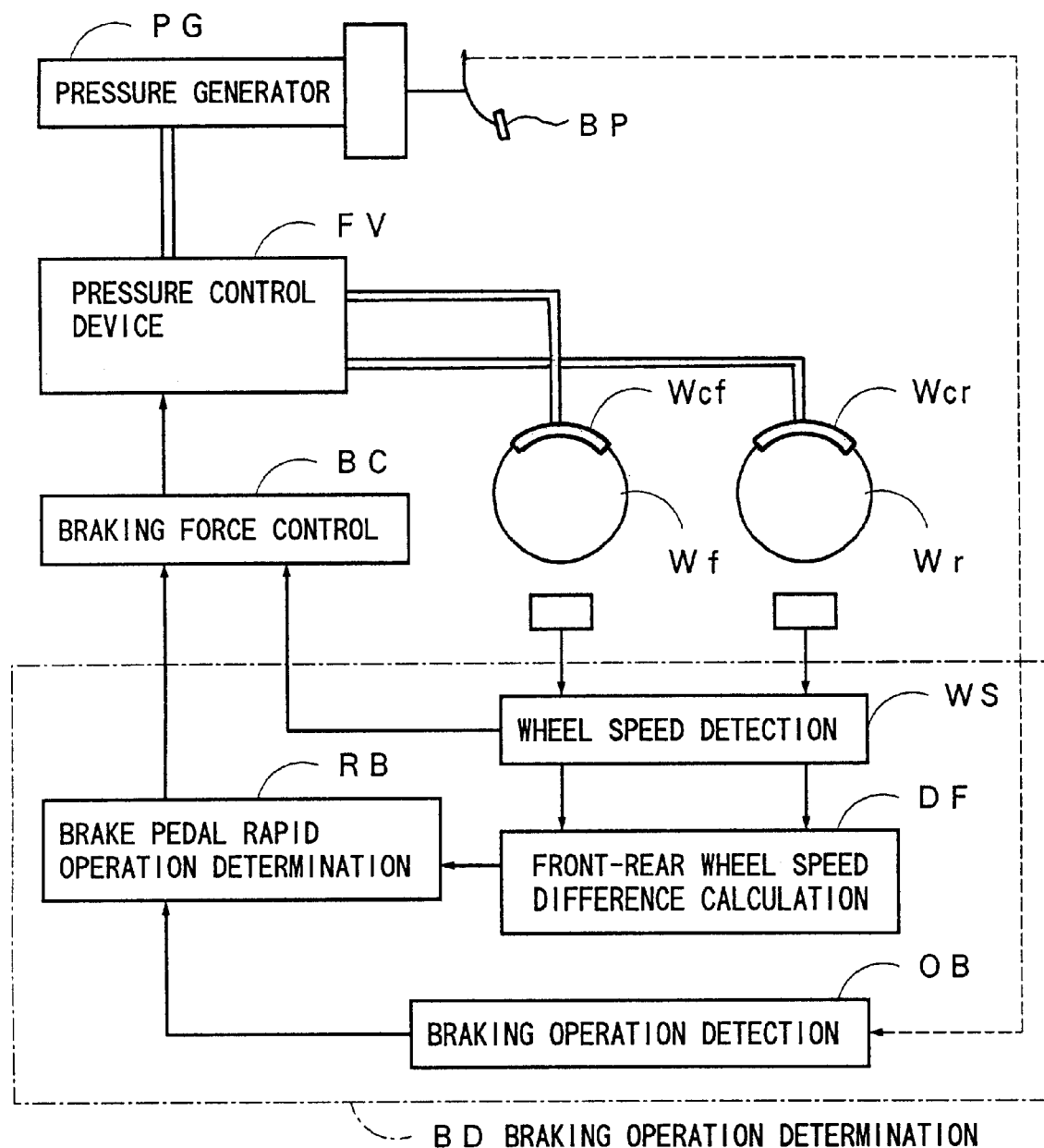
FIG. 1 is a general block diagram illustrating an apparatus for determining a state of braking operation, and a front-rear braking force distribution control system having the determining apparatus according to an embodiment of the present invention.

Referring to FIG. 1, there is schematically illustrated an apparatus for determining a state of braking operation, which is applicable to a front-rear braking force distribution control system according to an embodiment of the present invention. In a vehicle, there are disposed a wheel speed detection device WS for detecting each wheel speed of a front wheel Wf and a rear wheel Wr of the vehicle, and a front-rear wheel speed difference calculation device DF for calculating a wheel speed difference between the wheel speed of the front wheel Wf and the wheel speed of the rear wheel Wr detected by the wheel speed detection device WS. And, a braking operation determination device BD for determining a state of braking operation includes a braking operation detection device OB for detecting at least an operation of a brake pedal BP, and a rapid operation determination device RB for determining whether the brake pedal BP was rapidly depressed on the basis of the difference calculated by the wheel speed difference calculation device DF and the operation detected by the braking operation detection device OB.

The rapid operation determination device RB is adapted to determine that the brake pedal BP was rapidly depressed, in the case where it was determined that the wheel speed of the front wheel speed Wf exceeded the wheel speed of the rear wheel Wr after it was determined that the wheel speed of the front wheel Wf was lower than the wheel speed of the rear wheel Wr by more than a predetermined difference, within a predetermined time period after the braking operation detection device OB detected the operation of the brake pedal BP. Furthermore, there may be provided the vehicle deceleration calculation device (not shown) for calculating a vehicle deceleration on the basis of the wheel speeds detected by the wheel speed detection device WS. In this case, the rapid operation determination device RB may be adapted to determine that the brake pedal BP was rapidly depressed, in the case where it was determined that the vehicle deceleration was greater than a predetermined deceleration, and it was determined that the wheel speed of the front wheel Wf exceeded the wheel speed of the rear wheel Wr after it was determined that the wheel speed of the front wheel Wf was lower than the wheel speed of the rear wheel Wr by more than a predetermined difference, within a predetermined time period after the braking operation detection device OB detected the operation of the brake pedal BP.

And, the front-rear braking force distribution control system according to an embodiment of the present invention includes the braking operation determination device BD for determining the state of braking operation as shown in FIG. 1. The system further includes wheel brake cylinders Wcf and Wcr, which are operatively mounted on the front and rear wheels Wf and Wr to apply the braking force thereto, respectively. A pressure generating device, or pressure generator PG is provided for pressurizing brake fluid in response to operation of the brake pedal BP to generate a hydraulic braking pressure and supply the hydraulic braking pressure to each of the wheel brake cylinders Wcf and Wcr. And, a pressure control device FV is disposed between the pressure generator PG and the wheel brake cylinders Wcf and Wcr for controlling the hydraulic braking pressure in each of the wheel brake cylinders Wcf and Wcr. And, a braking force control device BC is provided for controlling the pressure control device FV at least on the basis of the result determined by the rapid operation determination device RB, and in response to the wheel speeds detected by the wheel speed detection device WS, and controlling the hydraulic braking pressure in each of the wheel brake cylinders Wcf and Wcr to adjust the braking force applied to the rear wheel Wr in accordance with a predetermined relationship with the braking force applied to the front wheel Wf. The braking operation determination device BD may be applied to various systems other than the front-rear braking force distribution control system, such as a brake-assist control system.

Figure 2:
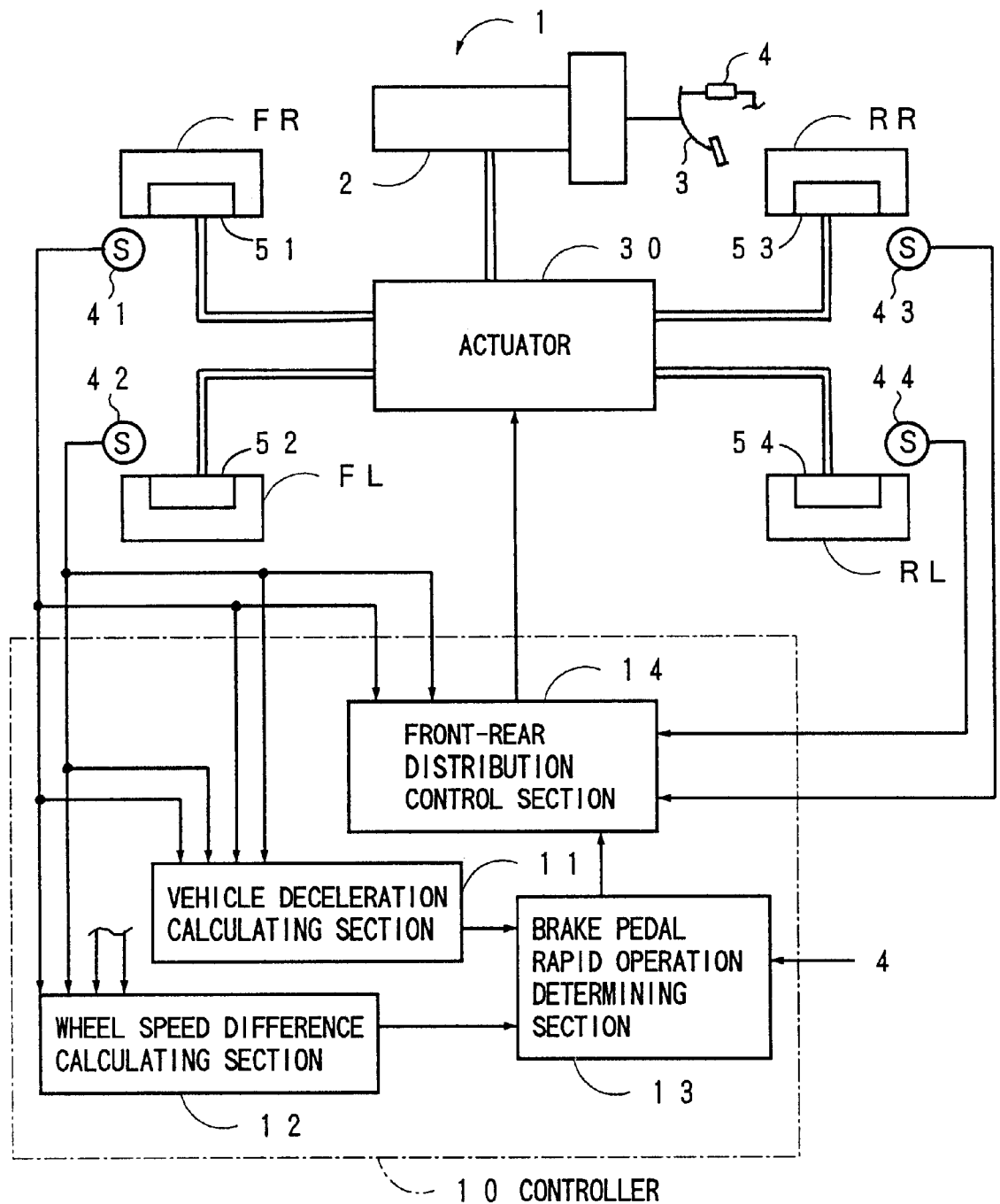
FIG. 2 is a block diagram illustrating a front-rear braking force distribution control system according to an embodiment of the present invention.

Referring to FIG. 2, there is illustrated the structure of the front-rear braking force distribution control system as described above, wherein an actuator 30, which serves as the pressure control device, is disposed in a hydraulic pressure passage which connects a pressure generator 1 having a master cylinder 2 operated in response to a brake pedal 3 to wheel brake cylinders 51–54 operatively mounted on the wheels FR, FL, RR, RL. The actuator 30 includes a pressure pump (not shown) driven by an electric motor (not shown) and a plurality of solenoid valves (not shown), which are energized or deenergized to increase, decrease or hold the hydraulic braking pressure in the wheel brake cylinders 51–54. The wheel FR designates the wheel located at the front right side as viewed from the position of a driver's seat, the wheel FL designates the wheel at the front left side, the wheel RR designates the wheel at the rear right side, and the wheel RL designates the wheel at the rear left side.

The actuator 30 is connected to an electronic controller 10 which controls to energize and deenergize each solenoid coil of the solenoid valves, and also the motor (not shown) is connected to the controller 10 to be controlled thereby. As shown in FIG. 2, at the wheels FR, FL, RR and RL, there are provided wheel speed sensors 41–44, which serve as the wheel speed detection device, respectively, and which are connected to the controller 10, so that a signal having pulses proportional to a rotational speed of each wheel, i.e., a wheel speed signal is fed to the controller 10. Also connected to the controller 10 is a brake switch 4, which is turned on when the brake pedal 3 is depressed and turned off when the brake pedal 3 is released, and which serves as the braking operation detection device. The controller 10 is provided with a known microcomputer (not shown) which includes a central processing unit or CPU, a read-only memory or ROM, a random access memory or RAM, a timer and the like.

In the controller 10, there are formed a vehicle deceleration calculating section 11, wheel speed difference calculating section 12, brake pedal rapid operation determining section 13 and front-rear braking force distribution control section 14. At the vehicle deceleration calculating section 11, an estimated vehicle speed Vso is calculated on the basis of the wheel speeds detected by the wheel speed sensors 41–44. For example, the maximum speed of the wheel speeds is calculated to obtain the estimated vehicle speed Vso at a position of the gravity center of the vehicle. Then, the estimated vehicle speed Vso is differentiated to obtain an estimated vehicle deceleration DVso. The minimum of the wheel speeds of front wheels 51 and 52 is calculated to provide a front reference wheel speed Vwfs at the wheel speed difference calculating section 12, and the wheel speed differences Vdr and Vdl between the front reference wheel speed Vwfs and the rear wheel speeds Vwrr and Vwrl of rear wheels 53 and 54 are calculated, respectively, as follows:

Vdr=Vwfs−Vwrr, and Vdl=Vwfs−Vwrl

Based upon the output of the brake switch 4, the vehicle deceleration DVso and the wheel speed differences Vdr and Vdl, it is determined at the rapid operation determining section 13 whether the brake pedal 3 was rapidly depressed, or not, and the result is fed to the front-rear braking force distribution control section 14. At the section 14, a pressure mode is selected from the decrease, pulse-increase and hold modes, with respect to the rear wheel brake cylinders 53 and 54, on the basis of the result of the rapid operation determining section 13, and in response to the wheel speed of each wheel, so that the actuator 30 is controlled in accordance with the selected pressure mode, so as to increase or decrease the hydraulic braking pressure in the wheel brake cylinders 53 and 54. The actuator 30 may be employed for an anti-skid control operation, wherein the hydraulic braking pressure in the front wheel brake cylinders 51 and 52 will be increased or decreased, as well.

Figure 3:
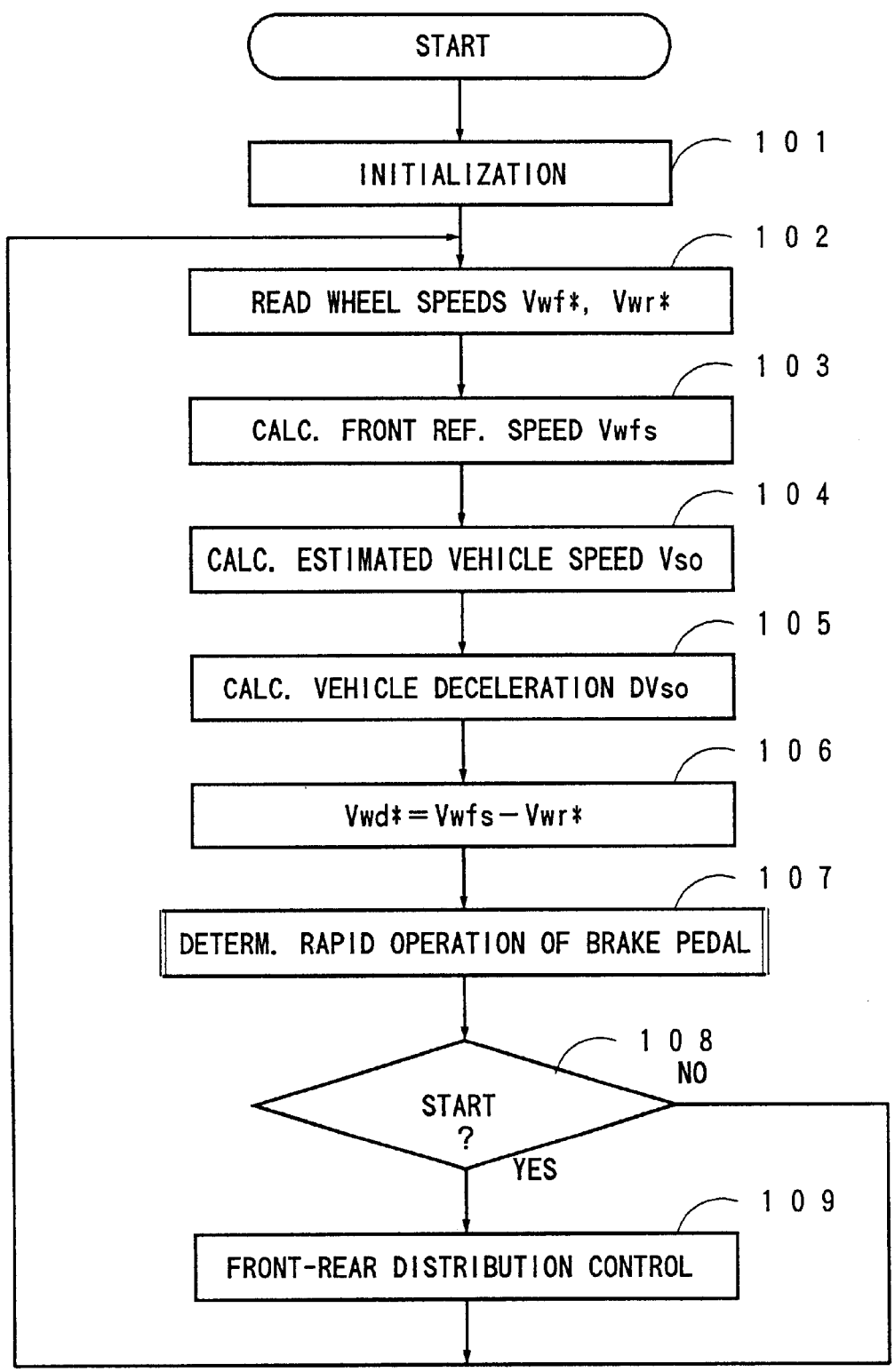
FIG. 3 is a flowchart showing a main routine of the front-rear braking force distribution control according to the above embodiment of the present invention.

According to the present embodiment as constituted above, the front-rear braking force distribution control is executed in accordance with a flowchart as shown in FIG. 3, wherein the program routine starts when an ignition switch (not shown) is turned on. At Step 101, an initialization of the system is made to clear various data, such as calculated data, wheel speeds Vwf* and Vwr* of the front and rear wheels, and so on. Then, at Step 102, the signals detected by the wheel speed sensors 41–44 are read, and the front reference wheel speed Vwfs is calculated at Step 103. The minimum of the front wheel speeds is provided for the front reference wheel speed Vwfs (=MIN(Vwfr,Vwfl)). The program further proceeds to Step 104 where the estimated vehicle speed Vso is calculated on the basis of the wheel speeds Vwf* and Vwr*, and then the estimated vehicle speed Vso is differentiated at Step 105, so that the estimated vehicle deceleration DVso is obtained. At Step 106, the wheel speed difference (Vwd*=Vwfs−Vwr*) between the front reference wheel speed Vwfs and the rear wheel speed Vwr* of the rear wheel to be controlled is calculated. Then, the program proceeds to Steps 107–109, where the rapid operation of the brake pedal 3 is determined, and the condition for beginning the front-rear braking force distribution control is determined, so that the distribution control is performed when the condition is fulfilled.

Figure 4:
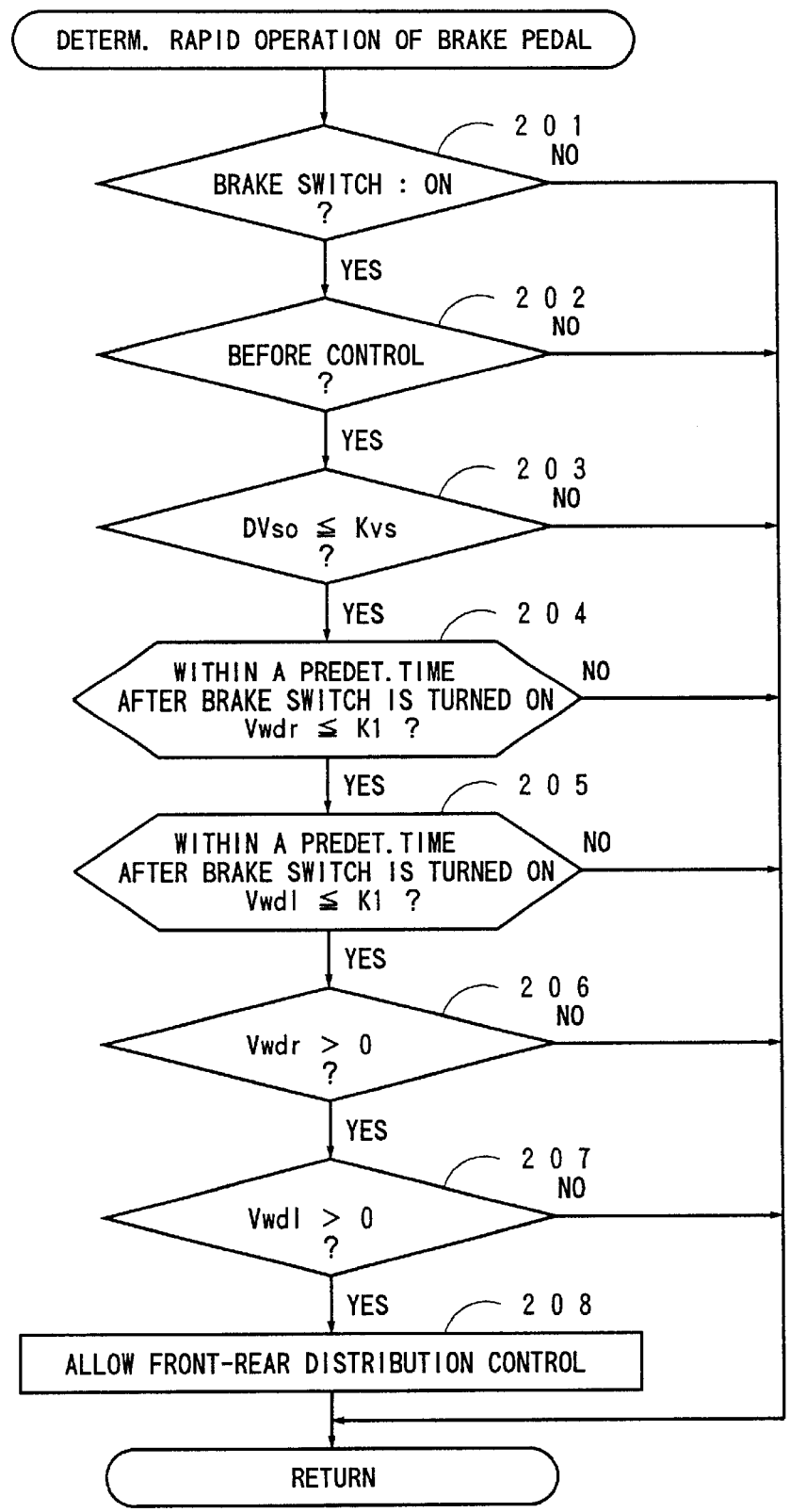
FIG. 4 is a flowchart showing a sub-routine for determining a rapid operation of a brake pedal according to the above embodiment of the present invention.
Figure 5:
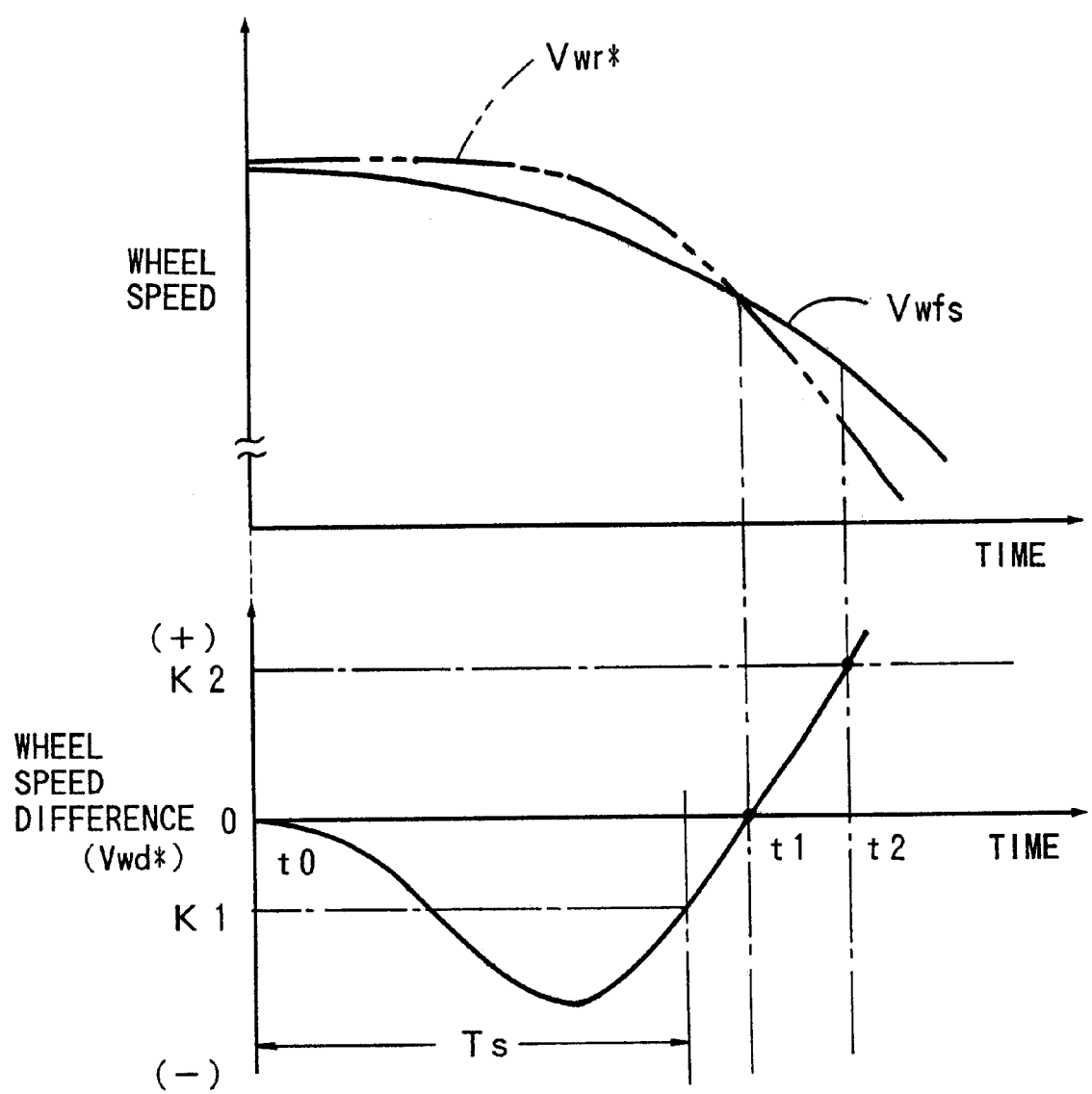
FIG. 5 is a diagram showing variations of front and rear wheel speeds, and the difference between them obtained when a brake pedal is rapidly depressed.
Figure 6:
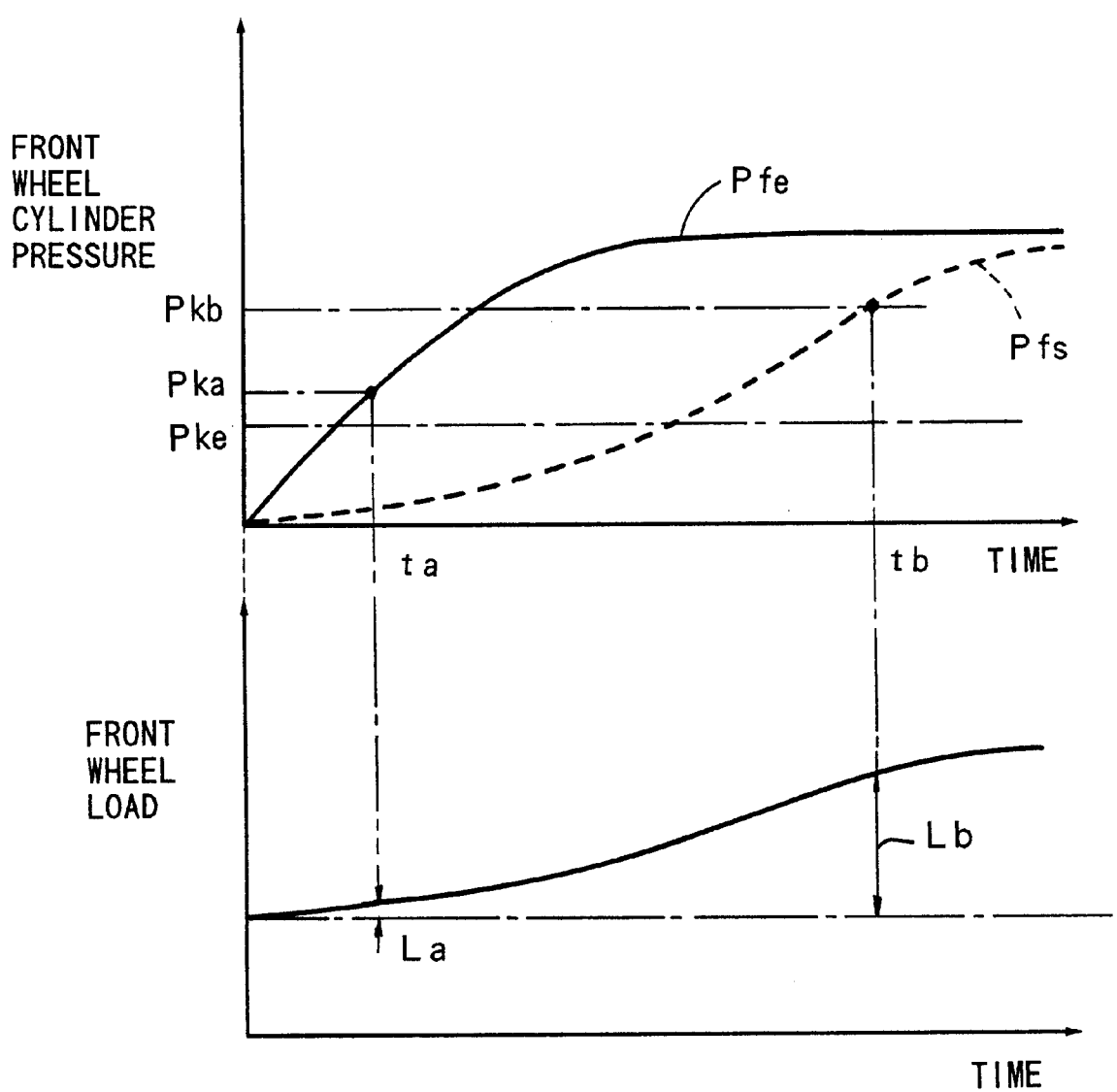
FIG. 6 is a diagram showing variations of front wheel cylinder pressure obtained when a brake pedal is rapidly depressed, and when the brake pedal is depressed normally, and a load shift to a front wheel.

Hereinafter will be described the determination of rapid operation of the brake pedal 3 to be executed at Step 107, with reference to FIGS. 4 and 5. First, it is determined at Step 201 in FIG. 4 whether the brake switch 4 is turned on. If it is determined that the brake switch 4 is turned on, the program proceeds to Step 202, where it is determined whether the controls such as the front-rear braking force distribution control, anti-skid control and the like have not been performed yet. Then, the vehicle deceleration DVso (negative value) is compared with a predetermined value Kvs (negative value) at Step 203. If the vehicle deceleration DVso has become smaller than the predetermined value Kvs before the front-rear braking force distribution control is performed, the program further proceeds to Step 204 and the following Steps, where the rapid operation of the brake pedal 3 will be determined. Otherwise, the program returns to the main routine as shown in FIG. 3. At Step 204, the wheel speed difference (Vwdr=Vwfs−Vwrr) between the front reference wheel speed Vwfs and the wheel speed Vwrr of the rear right wheel RR is compared with a predetermined value K1 (negative value), within a predetermined time period Ts (as shown in FIG. 5) after the brake switch 4 was turned on. Likewise, at Step 205, the wheel speed difference (Vwdl=Vwfs−Vwrl) between the front reference wheel speed Vwfs and the wheel speed Vwrl of the rear left wheel RL is compared with the predetermined value K1 (negative value), within the predetermined time period Ts after the brake switch 4 was turned on. When both of the wheel speed differences Vwdr and Vwdl have become to be of negative value, and smaller than the predetermined value K1, in other words when the rear wheel speeds Vwrr and Vwrl are greater than the front reference wheel speed Vwfs, the program further proceeds to Steps 206 and 207.

At Steps 206 and 207, it is determined whether both of the wheel speed differences Vwdr and Vwdl have become to be of positive value after the predetermined time period Ts elapsed, in other words it is determined whether the front reference wheel speed Vwfs has become to be greater than the rear wheel speeds Vwrr and Vwrl. When the front reference wheel speed Vwfs has become to be greater than the rear wheel speeds Vwrr and Vwrl, i.e., at the time "t1" as shown in FIG. 5, it is determined that the rapid operation of the brake pedal 3 has been performed, i.e., the brake pedal 3 has been depressed rapidly, so that the program proceeds to Step 208 where the front-rear braking force distribution control is allowed. Whereas, if the result of determination is negative at any one of Steps 201–207, the front-rear braking force distribution control is prohibited. Thus, immediately after it was determined that the rapid operation of the brake pedal 3 was performed (at the time "t1" in FIG. 5), the front-rear braking force distribution control is allowed, so that the front-rear braking force distribution control begins earlier than the time it begins in the previous system, i.e., at the time "t2" as shown in FIG. 5. As a result, even when the rapid operation of the brake pedal 3 has been performed, the front-rear braking force distribution control will not be delayed so much, but will be performed timely and properly. The structure of the actuator 30, the hydraulic brake pressure control in the front-rear braking force distribution control and the like are described in the prior art such as the Japanese Laid-open Publication No.8-108841, so that the explanation of them is omitted herein.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. An apparatus for determining a state of braking operation of a vehicle, comprising:

wheel speed detection means for detecting each wheel speed of a front wheel and a rear wheel of said vehicle;

wheel speed difference calculation means for calculating a wheel speed difference between the wheel speed of said front wheel and the wheel speed of said rear wheel detected by said wheel speed detection means;

braking operation detection means for detecting an operation of a brake pedal of said vehicle; and rapid operation determination means for determining whether said brake pedal was rapidly depressed on the basis of the difference calculated by said wheel speed difference calculation means and the operation of said brake pedal detected by said braking operation detection means.

2. The apparatus of claim 1, wherein said rapid operation determination means determines that said brake pedal was rapidly depressed, in the case where it was determined that the wheel speed of said front wheel exceeded the wheel speed of said rear wheel after it was determined on the basis of the difference calculated by said wheel speed difference calculation means that the wheel speed of said front wheel was lower than the wheel speed of said rear wheel by more than a predetermined difference, within a predetermined time period after said braking operation detection means detected the operation of said brake pedal.

3. The apparatus of claim 2, wherein said wheel speed difference calculation means selects a lower speed between a wheel speed of a front right wheel and a wheel speed of a front left wheel to provide a front reference wheel speed, and calculates a first wheel speed difference between the front reference wheel speed and the wheel speed of a rear right wheel detected by said wheel speed detection means, and a second wheel speed difference between the front reference wheel speed and the wheel speed of a rear left wheel detected by said wheel speed detection means, and wherein said vehicle rapid operation determination means determines that said brake pedal was rapidly depressed, in the case where it was determined that the front reference wheel speed exceeded the wheel speeds of said rear right and left wheels after it was determined that the front reference wheel speed was lower than the wheel speeds of said rear right and left wheels, respectively, by more than the predetermined difference, within the predetermined time period after said braking operation detection means detected the operation of said brake pedal.

4. The apparatus of claim 1, further comprising vehicle deceleration calculation means for calculating a vehicle deceleration on the basis of the wheel speeds detected by said wheel speed detection means, wherein said rapid operation determination means determines that said brake pedal was rapidly depressed, in the case where it was determined on the basis of the deceleration calculated by said vehicle deceleration calculation means that the vehicle deceleration was greater than a predetermined deceleration, and it was determined that the wheel speed of said front wheel exceeded the wheel speed of said rear wheel after it was determined on the basis of the difference calculated by said wheel speed difference calculation means that the wheel speed of said front wheel was lower than the wheel speed of said rear wheel by more than a predetermined difference, within a predetermined time period after said braking operation detection means detected the operation of said brake pedal.

5. The apparatus of claim 4, wherein said vehicle deceleration calculation means calculates an estimated vehicle speed on the basis of the wheel speeds detected by said wheel speed detection means, and differentiates the estimated vehicle speed to provide the vehicle deceleration.

6. The apparatus of claim 4, wherein said wheel speed difference calculation means selects a lower speed between a wheel speed of a front right wheel and a wheel speed of a front left wheel to provide a front reference wheel speed, and calculates a first wheel speed difference between the front reference wheel speed and the wheel speed of a rear right wheel detected by said wheel speed detection means, and a second wheel speed difference between the front reference wheel speed and the wheel speed of a rear left wheel detected by said wheel speed detection means, and wherein said vehicle rapid operation determination means determines that said brake pedal was rapidly depressed, in the case where it was determined that the vehicle deceleration was greater than the predetermined deceleration, and it was determined that the front reference wheel speed exceeded the wheel speeds of said rear right and left wheels after it was determined that the front reference wheel speed was lower than the wheel speeds of said rear right and left wheels, respectively, by more than the predetermined difference, within the predetermined time period after said braking operation detection means detected the operation of said brake pedal.

7. The apparatus of claim 1, wherein said braking operation detection means includes a brake switch, which is turned on when said brake pedal is depressed, and turned off when said brake pedal is released.

8. A front-rear braking force distribution control system having said apparatus for determining a state of braking operation of a vehicle as set forth in claim 1, comprising:

wheel brake cylinders operatively mounted on said front and rear wheels for applying the braking force thereto, respectively;

pressure generating means for pressurizing brake fluid in response to operation of said brake pedal to generate a hydraulic braking pressure and supply the hydraulic braking pressure to each of said wheel brake cylinders;

pressure control means disposed between said pressure generating means and said wheel brake cylinders for controlling the hydraulic braking pressure in each of said wheel brake cylinders; and braking force control means for controlling said pressure control means at least on the basis of the result determined by said rapid operation determination means, and in response to the wheel speeds detected by said wheel speed detection means, and controlling the hydraulic braking pressure in each of said wheel brake cylinders to adjust the braking force applied to said rear wheel in accordance with a predetermined relationship with the braking force applied to said front wheel.

* * * * *